United States Patent
Zorabedian (12) 
(10) Patent No.: US 7,483,146 B1
(45) Date of Patent: Jan. 27, 2009

(54) SYSTEMS CONFIGURED TO PROVIDE ILLUMINATION OF A SPECIMEN OR TO INSPECT A SPECIMEN

(75) Inventor: Paul Zorabedian, Mountain View, CA (US)

(73) Assignee: KLA-Tencor Technologies Corp., Milpitas, CA (US)

( * ) Notice: Subject to any disclaimer, the term of this patent is extended or adjusted under 35 U.S.C. 154(b) by 365 days.

(21) Appl. No.: 11/335,795

(22) Filed: Jan. 19, 2006

(51) Int. Cl.
*G01B 9/02* (2006.01)

(52) U.S. Cl. .......................................... 356/491; 372/25

(58) Field of Classification Search ................. 356/450, 356/491, 492; 372/25, 57, 27, 30
See application file for complete search history.

(56) References Cited

U.S. PATENT DOCUMENTS

| | | | |
|---|---|---|---|
| 3,447,856 A | 6/1969 | De Lange | |
| 5,716,324 A * | 2/1998 | Toida | 600/160 |
| 5,745,284 A * | 4/1998 | Goldberg et al. | 359/344 |
| 6,067,311 A * | 5/2000 | Morton et al. | 372/57 |
| 6,275,514 B1 | 8/2001 | Katzir et al. | |
| 6,765,934 B2 * | 7/2004 | Gross | 372/25 |
| 6,849,363 B2 * | 2/2005 | Ohashi et al. | 430/5 |
| 6,895,025 B2 * | 5/2005 | Herble et al. | 372/9 |

* cited by examiner

*Primary Examiner*—Tarifur Chowdhury
*Assistant Examiner*—Jonathan M Hansen
(74) *Attorney, Agent, or Firm*—Baker & McKenzie LLP (57) ABSTRACT

Systems configured to provide illumination of a specimen or to inspect a specimen are provided. One system includes a light source configured to generate pulses of light at a repetition rate. The system also includes optical elements arranged in a first interferometer configuration followed by a second interferometer configuration. The optical elements are configured to quadruple the repetition rate of the pulses of light. In addition, the system includes an electro-optic phase modulator configured to receive the pulses of light from the optical elements and to alter a polarization of the pulses of light at a rate of one half the quadrupled repetition rate such that the pulses of light can be directed to the specimen as effectively continuous-wave uniformly polarized illumination.

18 Claims, 3 Drawing Sheets

SYSTEMS CONFIGURED TO PROVIDE ILLUMINATION OF A SPECIMEN OR TO INSPECT A SPECIMEN

BACKGROUND OF THE INVENTION

1. Field of the Invention

This invention generally relates to systems configured to provide illumination of a specimen or to inspect a specimen. Certain embodiments relate to a system that is configured to multiply the repetition rate of pulses of light generated by a light source such that the pulses of light can be directed to a specimen as quasi-continuous-wave illumination.

2. Description of the Related Art

The following description and examples are not admitted to be prior art by virtue of their inclusion in this section.

Fabricating semiconductor devices such as logic and memory devices typically includes processing a substrate such as a semiconductor wafer using a large number of semiconductor fabrication processes to form various features and multiple levels of the semiconductor devices. For example, lithography is a semiconductor fabrication process that involves transferring a pattern from a reticle to a resist arranged on a semiconductor wafer. Additional examples of semiconductor fabrication processes include, but are not limited to, chemical-mechanical polishing, etch, deposition, and ion implantation. Multiple semiconductor devices may be fabricated in an arrangement on a single semiconductor wafer and then separated into individual semiconductor devices.

Inspection processes are used at various steps during a semiconductor manufacturing process to detect defects on wafers to promote higher yield in the manufacturing process and thus higher profits. Inspection has always been an important part of fabricating semiconductor devices such as integrated circuits. However, as the dimensions of semiconductor devices decrease, inspection becomes even more important to the successful manufacture of acceptable semiconductor devices because smaller defects can cause the devices to fail. For instance, as the dimensions of semiconductor devices decrease, detection of defects of decreasing size has become necessary since even relatively small defects may cause unwanted aberrations in the semiconductor devices.

Defects in reticles are also a potential source of yield reduction in integrated circuit manufacturing. Therefore, inspection of a reticle is a critical step in the reticle manufacturing process and after release of the reticle to production. As minimum pattern sizes shrink and integrated circuits are designed with higher device densities, reticle defects that were once tolerable may no longer be acceptable. For example, a single reticle defect may be repeated in each die in stepper systems and may kill every die in single-die reduction reticles. In addition, VLSI and ULSI-level integrated circuit manufacturing require substantially defect-free and dimensionally perfect reticles due to the critical dimension (CD) budget of such manufacturing.

Generally, sensitivity of an inspection system is related to optical resolution for techniques that use optical microscopes to examine wafers and reticles for defects. Therefore, one obvious way to improve the detection of relatively small defects is to increase the resolution of an optical inspection system. One way to increase the resolution of an optical inspection system is to decrease the wavelength at which the system operates. For instance, resolution is defined as: Resolution=$\lambda/n(NA)$, where $\lambda$ is the wavelength, n is the index of refraction, and NA is the numerical aperture of the optical system at the object. Therefore, resolution increases as wavelength decreases.

The minimum wavelength of current inspection and defect review tools is in the range of 248 to 266 nm. For example, current generations of reticle inspection tools use laser illumination at a wavelength of about 257 nm generated by an intra-cavity doubled argon (Ar)-ion laser. Next generation tools need to operate at a sub-200 nm wavelength and will require multiple stages of nonlinear wavelength up-conversion. With continuous-wave (cw) lasers, the multiple stages of up-conversion will require multiple resonant build-up cavities in addition to the ion laser, resulting in a light source that will have a high cost of ownership (expensive to purchase and maintain) and poor reliability. Therefore, the lack of inexpensive cw light sources for wavelengths below 200 nm make such light sources impractical for next generation inspection and defect review tools.

Mode-locked lasers are an attractive alternative for the sub-200 nm generation of tools because these lasers are based on solid-state laser technology. In addition, their high peak power permits efficient single-pass nonlinear wavelength up-conversion without the use of external resonant build-up cavities. A mode-locked laser may replace a cw laser without extensive inspection tool re-architecture if it operates at a sufficiently high pulse repetition rate. A calculation based on the requirements for speckle-contrast reduction indicate that a pulse repetition rate of greater than about 200 MHz is required for mode-locked lasers to be a viable option. However, mode-locked lasers are much more efficient when operated at pulse rates of about 80 MHz to about 90 MHz.

Accordingly, it would be advantageous to develop systems configured to provide illumination of a specimen such as a reticle or a wafer for applications such as inspection that include a simple and efficient optical configuration for quadrupling the repetition rate of pulses emitted by a light source such as a mode-locked laser.

SUMMARY OF THE INVENTION

The following description of various system embodiments is not to be construed in any way as limiting the subject matter of the appended claims.

One embodiment relates to a system configured to provide illumination of a specimen. The system includes a light source configured to generate pulses of light at a repetition rate. The system also includes optical elements arranged in a first interferometer configuration and a second interferometer configuration. The optical elements are configured to quadruple the repetition rate of the pulses of light. In addition, the system includes an electro-optic phase modulator configured to receive the pulses of light from the optical elements and to alter a polarization of the pulses of light at a rate of one half the quadrupled repetition rate such that the pulses of light can be directed to the specimen as effectively continuous-wave uniformly polarized illumination.

In one embodiment, the first interferometer configuration is a Michelson interferometer configuration. In another embodiment, the second interferometer configuration is a Mach-Zehnder configuration. In some embodiments, the optical elements of the second interferometer configuration include a polarizing component and a polarizing beam splitter.

In an additional embodiment, the system includes a set of nonlinear optical components configured to receive the pulses of light from the electro-optic phase modulator and to convert a frequency of the pulses of light. In a further embodiment, a power of the illumination is substantially equal to a power of the pulses of light generated by the light source.

In one embodiment, a wavelength of the pulses of light generated by the light source is about 800 nm. In another embodiment, the light source includes a mode-locked laser. In an additional embodiment, the pulses of light generated by the light source are linearly polarized. In some embodiments, the specimen is a wafer or a reticle. Each of the embodiments of the system described above may be further configured as described herein.

A different embodiment relates to another system configured to provide illumination of a specimen. This system includes a light source configured to generate pulses of light at a repetition rate. The system also includes optical elements arranged in a Michelson interferometer configuration followed by a Mach-Zehnder interferometer configuration. The optical elements are configured to quadruple the repetition rate of the pulses of light such that the pulses of light can be directed to the specimen as effectively continuous-wave illumination.

In one embodiment, the optical elements of the Mach-Zehnder interferometer configuration include a polarizing component and a polarizing beam splitter. In another embodiment, the system includes an electro-optic phase modulator configured to receive the pulses of light from the optical elements and to alter a polarization of the pulses of light at a rate of one half the quadrupled repetition rate such that the pulses of light have substantially the same polarization.

In an additional embodiment, the system includes a set of nonlinear optical components configured to receive the pulses of light from the optical elements and to convert a frequency of the pulses of light. In a further embodiment, a power of the illumination is substantially equal to a power of the pulses of light generated by the light source.

In one embodiment, a wavelength of the pulses of light generated by the light source is about 800 nm. In another embodiment, the light source includes a mode-locked laser. In some embodiments, the pulses of light generated by the light source are linearly polarized. In additional embodiments, the specimen includes a wafer or a reticle. Each of the embodiments of the system described above may be further configured as described herein.

An additional embodiment relates to a system configured to inspect a specimen. The system includes a light source configured to generate pulses of light at a repetition rate. The system also includes optical elements arranged in a first interferometer configuration and a second interferometer configuration. The optical elements are configured to quadruple the repetition rate of the pulses of light such that the pulses of light can be directed to the specimen as effectively continuous-wave illumination. In addition, the system includes a detection subsystem configured to generate output signals responsive to light from the specimen resulting from the illumination. The output signals can be used to detect defects on the specimen. This system may be further configured as described herein.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

As used herein, the term "specimen" refers to a reticle or a wafer. The terms "reticle" and "mask" are used interchangeably herein. A reticle generally includes a transparent substrate such as glass, borosilicate glass, and fused silica having opaque regions formed thereon in a pattern. The opaque regions may be replaced by regions etched into the transparent substrate. Many different types of reticles are known in the art, and the term reticle as used herein is intended to encompass all types of reticles.

As used herein, the term "wafer" generally refers to substrates formed of a semiconductor or non-semiconductor material. Examples of such a semiconductor or non-semiconductor material include, but are not limited to, monocrystalline silicon, gallium arsenide, and indium phosphide. Such substrates may be commonly found and/or processed in semiconductor fabrication facilities.

A wafer may include one or more layers formed upon a substrate. For example, such layers may include, but are not limited to, a resist, a dielectric material, and a conductive material. Many different types of such layers are known in the art, and the term wafer as used herein is intended to encompass a wafer including all types of such layers.

One or more layers formed on a wafer may be patterned or unpatterned. For example, a wafer may include a plurality of dies, each having repeatable pattern features. Formation and processing of such layers of material may ultimately result in completed devices. Many different types of devices may be formed on a wafer, and the term wafer as used herein is intended to encompass a wafer on which any type of device known in the art is being fabricated.

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals.

Figure 1:
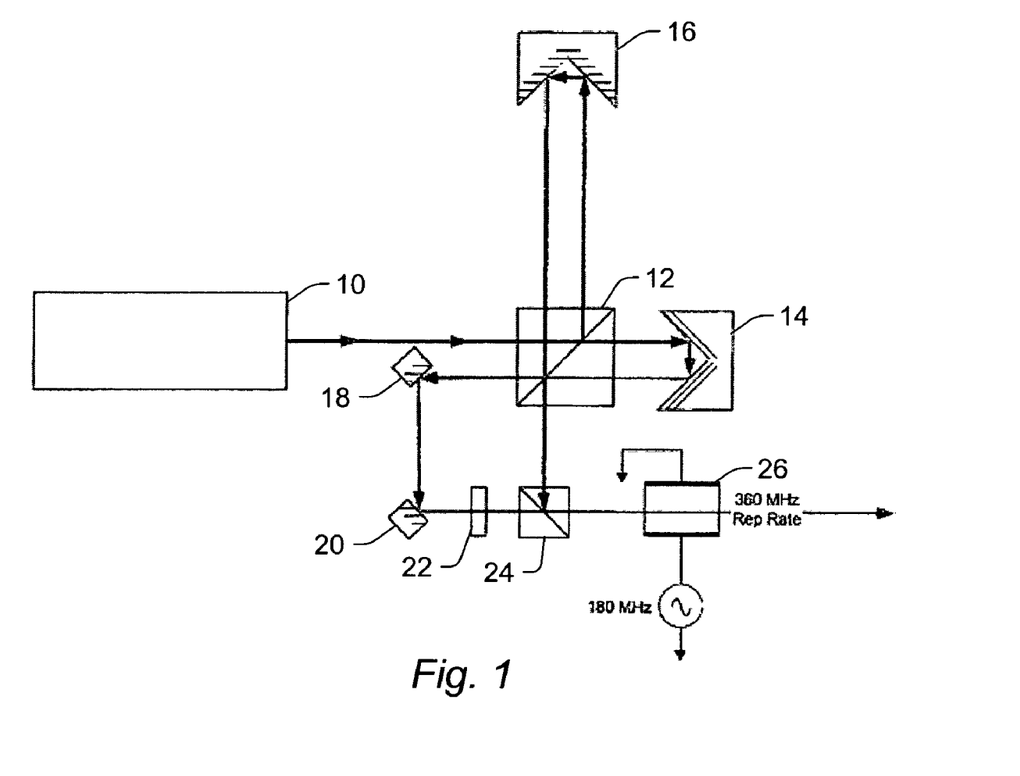
FIGS. 1-2 are schematic diagrams illustrating a side view of different embodiments of a system configured to provide illumination of a specimen.

FIG. 1 illustrates one embodiment of a system configured to provide illumination of a specimen. The system includes light source 10 that is configured to generate pulses of light at a repetition rate. In one embodiment, light source 10 includes a mode-locked laser. In another embodiment, a wavelength of the pulses of light generated by light source 10 is about 800 nm. In addition, the repetition rate at which the light source generates light pulses may be about 90 MHz. For example, a standard mode-locked laser outputs a light beam at about 800 nm as a train of pulses at a repetition rate, Rep, of about 80 MHz to about 90 MHz. One example of a commercially available laser that may be suitable for light source 10 is the Mai Tai One Box Ti:sapphire laser, which is available from Spectra-Physics, Mountain View, Calif. Other light sources that may be used as light source 10 include a solid-state laser, a fiber laser, any other laser that can be mode-locked, and any other laser that generates pulses of light or that can be pulsed. In some embodiments, the pulses of light generated by light source 10 are linearly polarized. Linearly polarized light pulses may be preferable such that the system can be configured to have nominally zero power loss as described further herein.

The system also includes optical elements arranged in a first interferometer configuration followed by a second interferometer configuration. For example, the optical elements of the first interferometer configuration may include beam splitter 12, which is a non-polarizing beam splitter, and reflective components 14 and 16. The optical elements of the second interferometer configuration may include beam splitter 12, reflective components 18 and 20, polarizing component 22, and polarizing beam splitter 24. In one embodiment, the first interferometer configuration is a Michelson interferometer configuration. In another embodiment, the second interferometer configuration is a Mach-Zehnder interferometer configuration. In this manner, the Michelson interferometer configuration and the Mach-Zehnder interferometer configuration share a common optical element (e.g., beam splitter 12).

A Michelson interferometer configuration may be generally defined as an "L-shaped" collection of mirrors. Basically, light enters the configuration and is split into two paths by a beam splitter. The light in either path travels to a mirror and then is reflected back to the beam splitter. There, the light from the two paths are recombined and, depending on the difference in phase between the two beams, there is either constructive or destructive interference between the light in the two beams.

A Mach-Zehnder interferometer configuration may be generally defined as an interferometric system in which a light beam is divided by a semi-transparent mirror. The two beams pass through separate optical paths and are recombined by a second semi-transparent mirror. In this manner, unlike the Michelson interferometer configuration that includes one beam splitter and two reflective components, the Mach-Zehnder interferometer configuration includes two beam splitters and two reflective components.

The optical components are configured to quadruple the repetition rate of the pulses of light. For example, light pulses from light source 10 are directed to beam splitter 12. Beam splitter 12 splits the light pulses into two beams of light pulses having approximately equal intensity. In this manner, one of the two beams is transmitted through the beam splitter while the other of the two beams is reflected by the beamsplitter. The two beams may propagate from the beam splitter at approximately right angles with respect to each other. The transmitted beam is directed to reflective component 14, and the reflected beam is directed to reflective component 16. Reflective components 14 and 16 may be configured as retro-reflectors. In one embodiment, the retro-reflectors may be cube-corner reflectors.

The two beams propagate over distances $L_1$ and $L_2$, respectively, (distances from the beam splitter to reflective components 14 and 16 and back to the beam splitter) that are different. In this manner, the pulses of light propagating along one of the paths may be delayed with respect to the pulses of light propagating along the other path. In a preferred embodiment, the paths lengths are arranged so that $L_1-L_2=\pm cR_{rep}/2$, where c is the speed of light. In this manner, the relative delay between the two paths of the Michelson interferometer configuration may be equal to about ½ of the time interval between adjacent pulses at the repetition rate of the light source. For example, if the pulses of light are generated by the light source at a repetition rate of 90 MHz, then the pulse period is 11.1 nsec. Therefore, the relative delay between the two paths of the Michelson interferometer configuration, $L_1-L_2$, may be equal to about 5.55 ns (i.e., 11.1 ns/2). As such, one of the beams of light pulses may be delayed by about 5.55 ns. In this manner, the pulses in the different beams are delayed with respect to each other by ½ of the original laser pulse delay. The reflected beams return to the non-polarizing beam splitter at a co-incident position.

Each of the beams reflected back to beam splitter 12 are partially reflected and partially transmitted by beam splitter 12 thereby creating third and fourth beams of light pulses, each of which contain delayed pulses and non-delayed light pulses. The delayed pulses are interleaved with the non-delay light pulses in both beams. In this manner, the Michelson interferometer configuration produces two separate beams of light pulses at a repetition rate that is twice the repetition rate of the light source. As such, each of the third and fourth output beams from the non-polarizing beam splitter contains a pulse train at a repetition rate of $2R_{rep}$. The third and fourth beams have approximately equal intensity. The non-polarizing beam splitter is configured such that the third and fourth output beams propagate from the non-polarizing beam splitter at approximately right angles.

The third and fourth output beams enter the Mach-Zehnder interferometer configuration from beam splitter 12. As shown in FIG. 1, one of the output beams is directed to reflective component 18, which directs the output beam to reflective component 20. Reflective components 18 and 20 may include any suitable reflective components known in the art such as flat mirrors. Reflective component 20 directs the light beam to polarizing component 22. In some embodiments, the polarizing component may be a half-wave optical retardation plate oriented at about 45° to the incident polarization. The output beam of the half-wave plate is thereby polarized at 90° to the beam incident upon it as well as to the second output beam from the non-polarizing beam splitter. In this manner, the beams in the two paths of the Mach-Zehnder interferometer configuration can be recombined by polarizing beam splitter 24 as described further herein without substantial loss.

As further shown in FIG. 1, the output beam from polarizing component 22 and the other output beam from beam splitter 12 are directed to polarizing beam splitter 24. As further shown in FIG. 1, reflective components 18 and 20 and polarizing component 22 are configured such that the output beam of polarizing component 22 is directed to polarizing beam splitter 24 at an angle of about 90° with respect to the second output beam. The polarization-rotated output beam and the non-polarization-rotated output beam from beam splitter 12 travel optical paths of total lengths $L_3$ and $L_4$, respectively, from beam splitter 12 to polarizing beam splitter 24. The path length difference between $L_3$ and $L_4$ is arranged so that $L_3-L_4=\pm cR_{rep}/4$. In this manner, the relative delay between the paths of the Mach-Zehnder interferometer configuration is about ¼ of the pulse period of the light source. For example, if the pulses of light are generated by the light source at a repetition rate of 90 MHz, then $L_3-L_4$ may be equal to about 2.775 ns. As such, one of the beams of light pulses may be delayed by about 2.775 ns. The polarizing beam splitter is configured such that the polarization-rotated beam is substantially transmitted by the polarizing beam splitter and the non-polarization-rotated beam is substantially reflected by the polarizing beam splitter thereby interleaving the polarization-rotated pulses and the non-polarization-rotated pulses creating a single output beam of pulses of light at a repetition rate that is 4 times the repetition rate of the light source, $4R_{rep}$ (e.g., 360 MHz for a light source having a repetition rate of 90 MHz).

In this manner, the system shown in FIG. 1 includes an interferometer arrangement for extra-cavity quadrupling of the pulse rate of a light source such as a mode-locked laser. As described above, the arrangement includes a Michelson interferometer with a non-polarizing beam splitter and a relative delay between beam paths of about ½ the light source pulse spacing followed sequentially by a Mach-Zehnder interferometer with a polarizing beam splitter and a relative delay between beam paths of about ¼ of the light source pulse spacing. Therefore, the optical elements are configured to quadruple the repetition rate of the pulses of light generated by the light source. As such, light exiting the polarizing beam splitter may be effectively continuous-wave illumination that can be directed to the specimen as described further herein.

However, pulses in the output beam of the polarizing beam splitter are alternatingly polarized vertically and horizontally. In other words, each pulse in the pulse train exiting the polarizing beam splitter has a polarization that is orthogonal to the polarization of the pulses adjacent to it in the pulse train. In one embodiment, the system includes electro-optic phase modulator 26 configured to receive the pulses of light from the optical elements (e.g., from polarizing beam splitter 24). In addition, electro-optical phase modulator 26 is configured to alter a polarization of the pulses of light at a rate of one half the quadrupled repetition rate such that the pulses of light have substantially the same polarization. In this manner, the electro-optic phase modulator may be configured to losslessly produce a substantially uniform polarization for all of the pulses in the interleaved beam. As such, the pulses of light can be directed to the specimen as effectively continuous-wave uniformly polarized illumination.

In one such embodiment, the electro-optic phase modulator may be an electro-optic (EO) half wave plate or "EO retarder." When no voltage is applied to the EO retarder, the polarization of the optical output of the EO retarder is unchanged. However, when a half-wave voltage is applied, the polarization of the optical output of the EO retarder is rotated by 90°. Thus, the retarder may be fed an electrical drive signal of half-wave voltage pulses at a rate of twice the laser pulse repetition rate, $2R_{rep}$ (e.g., 180 MHz for light pulses generated by the light source at a repetition rate of 90 MHz), which is also one half of the repetition rate of the pulses of light exiting the polarizing beam splitter. The electrical drive signal may also be synchronized with the pulses from the laser. The electrical drive signal may be synchronized with the pulses from the laser using any method or device known in the art. In this manner, the polarization of every second pulse in the pulse train exiting the polarizing beam splitter is rotated by 90°. As such, all of the pulses of light in the optical output of the EO retarder will have uniform polarization. In this manner, the output of the EO phase modulator is a beam of substantially uniformly polarized light pulses at a pulse repetition rate of four times the laser repetition rate. As such, the light exiting the EO phase modulator is effectively continuous-wave uniformly polarized illumination that can be directed to the specimen as described further herein. Each of the embodiments of the system shown in FIG. 1 may be further configured as described herein.

As described above, therefore, the system shown in FIG. 1 is configured as an optical system for quadrupling the repetition rate of a pulse train emitted by a light source such as a mode-locked laser. As such, the system is configured to provide illumination to a specimen (not shown in FIG. 1) as effectively continuous-wave (cw) illumination. In one example, the system may be used to provide quasi-cw illumination for an inspection system such as a time delay integration (TDI) based reticle inspection system that operates at about 1.6 GPixels/sec, which requires at least 250,000 independent views of a reticle per 0.7 msec integration window. Therefore, illumination that includes pulses having a repetition rate of greater than or equal to about 360 MHz may be suitable for such applications. In this manner, effectively continuous-wave illumination as used herein refers to illumination that has a repetition rate that is sufficiently high such that the pulses in the light used for illumination will not be "seen" by the detector(s) of an inspection system. As described herein, the system embodiments are capable of providing illumination at such a repetition rate.

As described further above, the system shown in FIG. 1 may also be configured to provide illumination to the specimen as effectively continuous-wave uniformly polarized illumination. Furthermore, since the system shown in FIG. 1 may include a light source such as a mode-locked laser, the system may have relatively low cost of ownership and relatively good reliability, particularly in comparison to cw lasers. Moreover, the effectively continuous-wave illumination is provided by a system that is relatively simple and efficient thereby providing a viable solution for quasi-cw illumination systems that can be used in reticle and wafer inspection systems. In addition, the illumination systems may be used in inspection tools without extensive re-architecture since they operate at sufficiently high pulse repetition rates.

Figure 2:
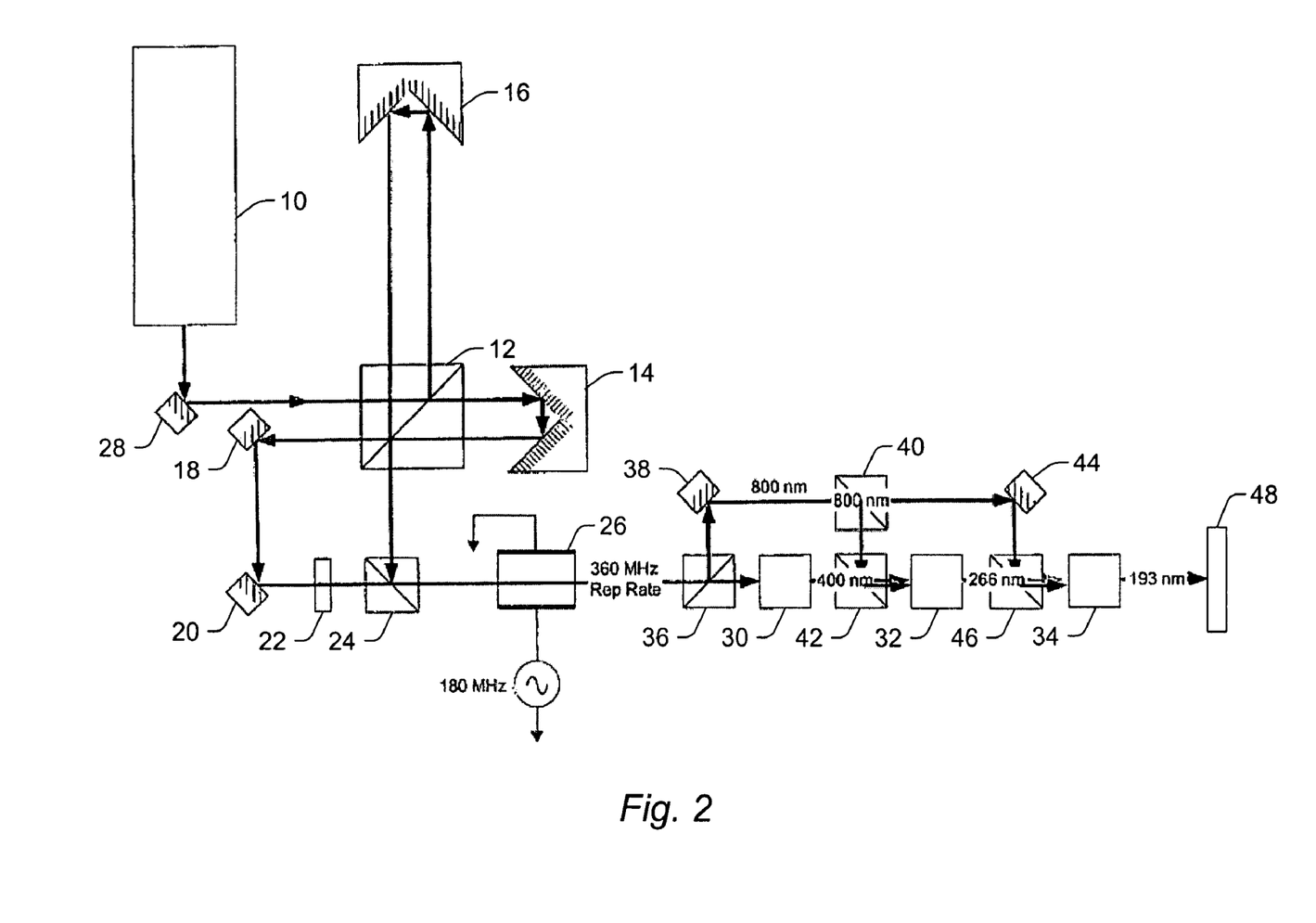

Another embodiment of a system that is configured to provide illumination of a specimen is illustrated in FIG. 2. In this embodiment, the system includes light source 10, beam splitter 12, reflective components 14, 16, 18, and 20, polarizing component 22, polarizing beam splitter 24, and optionally electro-optic phase modulator 26, all of which may be configured as described above. In addition, this embodiment of the system includes reflective component 28, which is configured to direct the pulses of light from light source 10 to beam splitter 12. Reflective component 28 may include any suitable reflective component known in the art such as a flat mirror. Reflective component 28 may be included in the system to shorten the optical path of the system. In addition, more than one such reflective component may be included in this system.

The system shown in FIG. 2 also includes a set of nonlinear optical components configured to receive the pulses of light from the electro-optic phase modulator (e.g., from the optical elements via the electro-optic phase modulator) or directly from the optical elements if the electro-optic phase modulator is not included in the system. The set of nonlinear optical components is also configured to convert a frequency of the pulses of light. The set of nonlinear optical components includes second harmonic generator 30, sum frequency mixing component 32, and sum frequency mixing component 34.

In one embodiment, light from electro-optic phase modulator 26 is directed to beam splitter 36. Beam splitter 36 may be configured to split the light from the electro-optic phase modulator into two beams of light having approximately equal intensities, which propagate from the beam splitter along paths that are arranged at an angle of about 90° with respect to each other. One of the two beams is directed to second harmonic generator 30, and the other beam is directed to reflective component 38. In one example, if the pulses of light generated by the light source have a wavelength of about 800 nm, then the pulses of light exiting the second harmonic generator may have a wavelength of about 400 nm. The second harmonic generator may include any suitable such optical component known in the art.

Light directed to reflective component 38 is directed to beam splitter 40. Light directed to beam splitter 40 is split into two beams having approximately equal intensities, which propagate from the beam splitter along paths that are arranged at an angle of about 90° with respect to each other. Beam splitter 40 is configured such that one of the beams is directed to beam splitter 42 and the other beam is directed to reflective component 44. Light exiting the second harmonic generator is also directed to beam splitter 42. Beam splitter 42 may be configured to transmit the light from the second harmonic generator and to reflect the light from beam splitter 40. For example, since the light from the second harmonic generator and the light from beam splitter 40 have different frequencies, the beam splitter may be configured to reflect or transmit the light based on the frequency of the light. In this manner, both light beams having different frequencies are directed by beam splitter 42 to sum frequency mixing component 32. Sum frequency mixing component 32 may include any suitable sum frequency mixing component known in the art. In one example, if the light beams directed to sum frequency mixing component 32 have wavelengths of 400 nm and 800 nm, the light exiting sum frequency mixing component 32 will have a wavelength of about 266 nm according to the following equation:

$$\frac{1}{\lambda_{out}} = \frac{1}{\lambda_1} + \frac{1}{\lambda_2}.$$

Light directed to reflective component 44 is directed to beam splitter 46. Light exiting sum frequency mixing component 32 is also directed to beam splitter 46. Beam splitter 46 may be configured to transmit the light from sum frequency mixing component 32 and to reflect the light from reflective component 44. For example, since the light from sum frequency mixing component 32 and the light from reflective component 44 have different frequencies, beam splitter 46 may be configured to reflect or transmit the light based on the frequency of the light. In this manner, both light beams having different frequencies are directed by beam splitter 46 to sum frequency mixing component 34. This sum frequency mixing component may be configured as described above. Therefore, if the light beams directed to sum frequency mixing component 34 have wavelengths of about 266 nm and 800 nm, the light exiting sum frequency mixing component 34 will have a wavelength of about 193 nm. In this manner, the set of nonlinear optical components is configured for single-pass nonlinear wavelength up-conversion of the light from the optical elements or the electro-optic modulator.

Light exiting sum frequency mixing component 34 may be directed to specimen 48. Specimen 48 may be a wafer or a reticle, which may be further configured as described above. In addition, one or more optical components (not shown) may be disposed in the path of the light exiting sum frequency mixing component 34. Such optical components may include, but are not limited to, an objective lens. The objective lens may be configured to focus the light onto the specimen. The system may also include any other suitable optical components positioned in the light path between sum frequency mixing component 34 and specimen 48. Each of the embodiments of the system shown in FIG. 2 may be further configured as described herein.

As described above, therefore, the system shown in FIG. 2 may be configured as a sub-200-nm quasi-continuous-wave optical system that includes a mode-locked near IR solid-state laser, a repetition rate quadrupler, and a chain of single-pass nonlinear wavelength up-conversion crystals. In this manner, the system shown in FIG. 2 is configured to provide illumination to specimen 48 as effectively continuous-wave illumination. Although the system is shown in FIG. 2 to illuminate specimen 48 at an approximately normal angle of incidence, it is to be understood that the system may be configured to illuminate the specimen at any suitable angle of incidence. In addition, the system shown in FIG. 2 may be configured to provide illumination to specimen 48 as effectively continuous-wave uniformly polarized illumination. Furthermore, the system shown in FIG. 2 may be configured to provide illumination to specimen 48 at a wavelength that is substantially lower than the wavelength of the light generated by the light source. In addition, in one embodiment, the system is configured such that a power of the illumination directed to the specimen is substantially equal to a power of the pulses of light generated by the light source. Therefore, the system advantageously has nominally zero power loss.

Moreover, since the system shown in FIG. 2 may include a light source such as a mode-locked laser, the system may have relatively low cost of ownership, particularly in comparison to a cw source based on an intra-cavity doubled Ar-ion laser, and relatively good reliability, particularly in comparison to cw lasers that can operate at approximately the same wavelength. In addition, the approximately cw illumination is provided by a system that is relatively simple and efficient thereby providing quasi-cw illumination systems that can be used for applications such as reticle and wafer inspection requiring illumination at wavelengths that are less than 200 nm.

Figure 3:
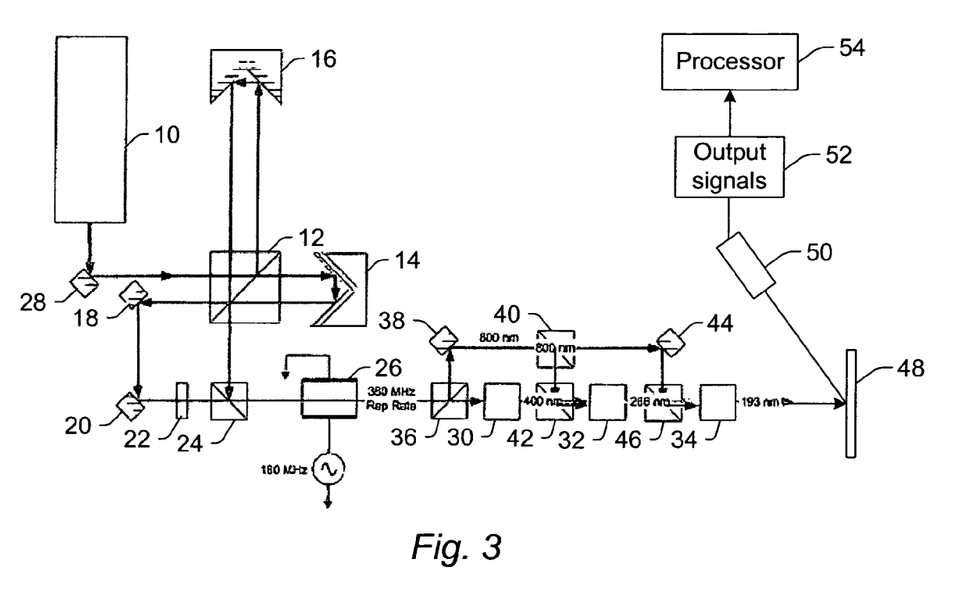
FIG. 3 is a schematic diagram illustrating a side view of one embodiment of a system configured to inspect a specimen.

An additional embodiment relates to a system configured to inspect a specimen such as a wafer or reticle. One such embodiment of a system is illustrated in FIG. 3. The system includes light source 10 configured to generate pulses of light at a repetition rate. Light source 10 may be further configured as described herein. The system also includes optical elements (e.g., beam splitter 12, reflective components 14, 16, 18, and 20, polarizing component 22, and polarizing beam splitter 24) arranged in a first interferometer configuration followed by a second interferometer configuration. The optical elements are configured to quadruple the repetition rate of the pulses of light such that the pulses of light can be directed to specimen 48 as effectively continuous-wave illumination. In this manner, light source 10 and the optical elements may form at least a portion of a system configured to provide illumination of specimen 48. The system configured to provide illumination of specimen 48 may also include any of the other optical components that are shown in FIG. 3 and described further above with corresponding reference numerals.

The system shown in FIG. 3 also includes detection subsystem 50 that is configured to generate output signals 52 resulting from illumination of specimen 48. Detection subsystem 50 may include, for example, one or more light collectors configured to collect light from the specimen and one or more detectors configured to detect light collected by the light collector(s). The light collector(s) and the detector(s) may include any suitable components known in the art. As shown in FIG. 3, the detection subsystem may be configured to detect light scattered from specimen 48. However, detection subsystem 50 may alternatively be configured to detect light reflected or transmitted by the specimen. In addition, the system may include more than one detection subsystem (not shown). Each of the detection subsystems may be configured to detect the same type of light (e.g., multiple scattered light detection subsystems) or different types of light (e.g., one or more scattered light detection subsystems, one or more reflected light detection subsystems, one or more transmitted light detection subsystems, etc.).

Output signals 52 generated by detection subsystem 50 can be used to detect defects on specimen 48. For example, processor 54 may be coupled to detection subsystem 50 by a transmission medium (not shown). The transmission medium may include any suitable transmission medium known in the art. In addition, one or more components (not shown) such as analog-to-digital converters may be interposed between the processor and the detection subsystem. In this manner, processor 54 may be configured to receive output signals 52 from detection subsystem 50. In addition, processor 54 may use output signals 52 to detect defects on specimen 48. The processor may be configured to use any suitable method and/or algorithm known in the art to detect the defects on the specimen. The processor may also be configured to perform any other defect or inspection related functions known in the art (e.g., defect mapping, defect classification, etc.). Furthermore, the system shown in FIG. 3 may be configured as a defect review tool in some embodiments.

Processor 54 may take various forms, including a personal computer system, mainframe computer system, workstation, image computer, parallel processor, or any other device known in the art. In general, the term "computer system" may be broadly defined to encompass any device having one or more processors, which executes instructions from a memory medium.

In some embodiments, the inspection systems described herein may be configured as "stand alone tools" or tools that are not physically coupled to a process tool. However, such a system may be coupled to a process tool (not shown) by a transmission medium, which may include wired and wireless portions. The process tool may include any process tool known in the art such as a lithography tool, an etch tool, a deposition tool, a polishing tool, a plating tool, a cleaning tool, or an ion implantation tool. The process tool may be configured as a cluster tool or a number of process modules coupled by a common handler.

The results of the inspection performed by the systems described herein may be used to alter a parameter of a process or a process tool using a feedback control technique, a feedforward control technique, and/or an in situ control technique. The parameter of the process or the process tool may be altered manually or automatically.

Further modifications and alternative embodiments of various aspects of the invention may be apparent to those skilled in the art in view of this description. For example, systems configured to provide illumination of a specimen or to inspect a specimen are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system configured to provide illumination of a specimen, comprising:
    a light source configured to generate pulses of light at a repetition rate;
    optical elements arranged in a first interferometer configuration and a second interferometer configuration, wherein the first interferometer configuration is positioned in a path of the pulses of light between the light source and the second interferometer configuration, wherein the second interferometer configuration is positioned in the path of the pulses of light between the first interferometer configuration and the specimen, wherein the first interferometer configuration is a Michelson interferometer configuration, wherein the second interferometer configuration is a Mach-Zehnder interferometer configuration, and wherein the optical elements are configured to quadruple the repetition rate of the pulses of light; and
    an electro-optic phase modulator configured to receive the pulses of light from the optical elements and to alter a polarization of the pulses of light at a rate of one half the quadrupled repetition rate such that the pulses of light can be directed to the specimen as effectively continuous-wave uniformly polarized illumination.

2. The system of claim 1, wherein the optical elements of the second interferometer configuration comprise a polarizing component and a polarizing beam splitter.

3. The system of claim 1 further comprising a set of nonlinear optical components configured to receive the pulses of light from the electro-optic phase modulator and to convert a frequency of the pulses of light.

4. The system of claim 1, wherein a power of the illumination is substantially equal to a power of the pulses of light generated by the light source.

5. The system of claim 1, wherein a wavelength of the pulses of light generated by the light source is about 800 nm.

6. The system of claim 1, wherein the light source comprises a mode-locked laser.

7. The system of claim 1, wherein the pulses of light generated by the light source are linearly polarized.

8. The system of claim 1, wherein the specimen comprises a wafer or a reticle.

9. A system configured to provide illumination of a specimen, comprising:
    a light source configured to generate pulses of light at a repetition rate; and
    optical elements arranged in a Michelson interferometer configuration and a Mach-Zehnder interferometer configuration, wherein the Michelson interferometer configuration is positioned in a path of the pulses of light between the light source and the Mach-Zehnder interferometer configuration, wherein the Mach-Zehnder interferometer configuration is positioned in the path of the pulses of light between the Michelson interferometer configuration and the specimen wherein the optical elements are configured to quadruple the repetition rate of the pulses of light such that the pulses of light can be directed to the specimen as effectively continuous-wave illumination.

10. The system of claim 9, further comprising an electro-optic phase modulator configured to receive the pulses of light from the optical elements and to alter a polarization of the pulses of light at a rate of one half the quadrupled repetition rate such that the pulses of light have substantially the same polarization.

11. The system of claim 9, wherein the optical elements of the Mach-Zehnder interferometer configuration comprise a polarizing component and a polarizing beam splitter.

12. The system of claim 9, further comprising a set of nonlinear optical components configured to receive the pulses of light from the optical elements and to convert a frequency of the pulses of light.

13. The system of claim 9, wherein a power of the illumination is substantially equal to a power of the pulses of light generated by the light source.

14. The system of claim 9, wherein a wavelength of the pulses of light generated by the light source is about 800 nm.

15. The system of claim 9, wherein the light source comprises a mode-locked laser.

16. The system of claim 9, wherein the pulses of light generated by the light source are linearly polarized.

17. The system of claim 9, wherein the specimen comprises a wafer or a reticle.

18. A system configured to provide illumination of a specimen, comprising:

a light source configured to generate pulses of light at a repetition rate;

optical elements arranged in a first interferometer configuration and a second interferometer configuration, wherein the first interferometer configuration is positioned in a path of the pulses of light between the light source and the second interferometer configuration, wherein the second interferometer configuration is positioned in the path of the pulses of light between the first interferometer configuration and the specimen, wherein the first interferometer configuration is a Michelson interferometer configuration, wherein the second interferometer configuration is a Mach-Zehnder interferometer configuration, and wherein the optical elements are configured to quadruple the repetition rate of the pulses of light such that the pulses of light can be directed to the specimen as effectively continuous-wave illumination; and a detection subsystem configured to generate output signals responsive to light from the specimen resulting from the illumination, wherein the output signals can be used to detect defects on the specimen.

\* \* \* \* \*